Figure 1:
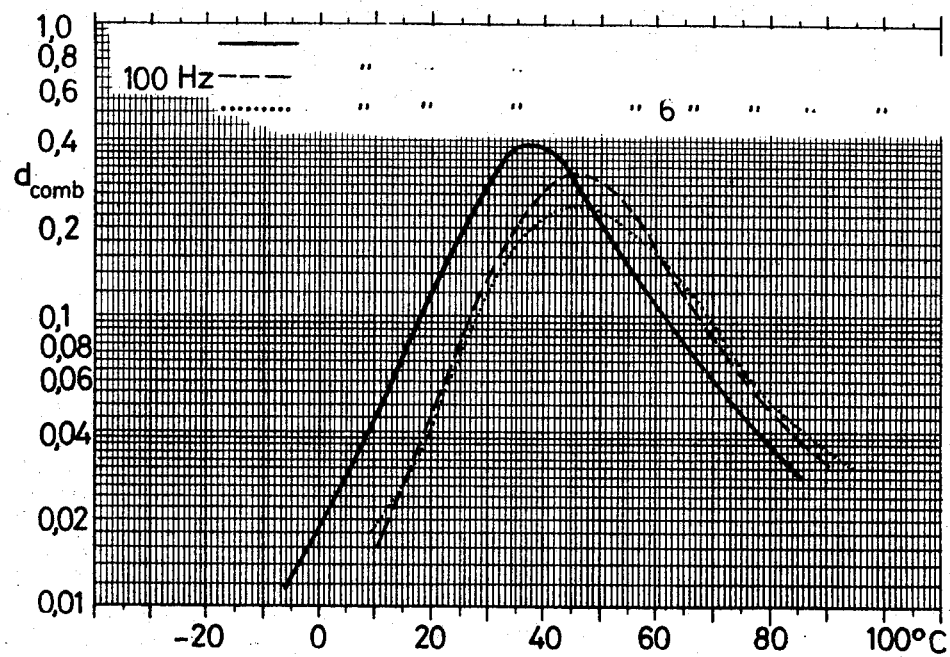

United States Patent [19]
Becker et al.

[11] 3,847,726
[45] Nov. 12, 1974

[54] VIBRATION-DAMPING SHEET METAL LAMINATES

[75] Inventors: Wilhelm Becker; Peter Osse, both of Hamburg; Richard Gutte, Oststeinbek; Friedrich Hochbach, Glinde, all of Germany

[73] Assignee: Reichhold-Albert-Chemie Aktiengesellschaft, Hamburg, Germany

[22] Filed: Apr. 24, 1972

[21] Appl. No.: 246,921

[30] Foreign Application Priority Data
Apr. 23, 1971 Switzerland.......................... 5926/71

[52] U.S. Cl................ 161/186, 156/330, 156/331, 156/335, 161/215, 161/219, 181/33 GA, 260/47 EN
[51] Int. Cl...... B32b 15/08, B32b 27/38, C09j 5/00
[58] Field of Search................... 156/330, 331, 335; 161/186, 215, 219; 260/47 EN; 181/33 GA

[56] References Cited
UNITED STATES PATENTS

| | | | |
|---|---|---|---|
| 3,277,052 | 10/1966 | Thompson et al.............. | 260/47 EN |
| 3,285,991 | 11/1966 | Sellers............................... | 260/831 |
| 3,299,169 | 1/1967 | Smith................................ | 260/830 |
| 3,306,809 | 2/1967 | Williamson et al................ | 161/185 |
| 3,351,574 | 11/1967 | Hicks et al....................... | 260/18 EP |
| 3,366,600 | 1/1968 | Haberlin et al................. | 260/47 EN |
| 3,462,393 | 8/1969 | Legler............................ | 260/47 EN |
| 3,575,870 | 4/1971 | Shimoyama........................ | 252/182 |

Primary Examiner—Charles E. Van Horn
Assistant Examiner—Robert A. Dawson
Attorney, Agent, or Firm—Gordon W. Hueschen

[57] ABSTRACT

The invention relates to the manufacture of vibration-damping sheet metal laminates having a high temperature band width in the frequency range of 100 to 1,000 Hz by employing epoxy resin-curing agent systems as intermediate layer.

8 Claims, 2 Drawing Figures

VIBRATION-DAMPING SHEET METAL LAMINATES

CROSS-REFERENCES TO RELATED APPLICATIONS

Applicant claims priority under 35 U.S.C. 119 for application Ser. No. 5926/71, filed Apr. 23, 1971 in the Patent Office of Switzerland.

The disclosure of applicant's abandoned applications entitled "Curable 1,2-Epoxide and Substituted Phenol Compositions", Ser. No. 199,326 and "Process for the Manufacture of Internally Plasticized Epoxy Resins", Ser. No. 160,148, are incorporated herein.

BACKGROUND OF THE INVENTION

1. Field of the Invention

It is known that metals possess a low internal damping, so that sheet metal constructions, when mechanically stressed by being struck or knocked, or under the influence of periodic forces, are easily excited into slightly damped characteristic vibrations or bending resonances of large amplitudes and as a result radiate a large amount of objectionable air-transmitted noise in the form of a booming noise. In this category, unpleasant and in most cases very loud sources of noise are above all sheet metal constructions of large surface area, in which, additionally, the dissipation of sound through the material plays a special role. Radiation of sound through the air, and conduction of sound through the material, can in part be suppressed by suitable damping measures (anti-boom measures).

According to the process of the invention, curable mixtures are very particularly used as vibration-damping epoxide resin adhesives. The vibration-damping epoxide resin bonds obtained in accordance with the examples have given the results shown in the Tables.

2. Prior Art

The use of damping coverings on one side has been known for some time. A more recent development consists of vibration-damping sheet metal laminates which contain a high-polymer interlayer material, and with these laminates better damping is achieved than with sheet metal with covering layers applied to one side. Depending on the nature of this high-polymer interlayer material, the sheet metal laminates in certain temperature ranges (temperature band width) show optimum damping in the frequency range which is of interest - the measurements generally being carried out between 100 and 1,000 Hz. According to Dr. Alfred Schommer, Klebzig Fachberichte number 7, 1966, pages 301–309, L. A. Klebzig Publishing House, Dusseldorf, Germany, a temperature band width of about 50°C in the range of 0°C to 50°C and 40° to 90°C respectively, is achieved by employing a modified vinyl acetate copolymer as intermediate layer (page 5, column 2, last 8 lines).

Using the epoxide resin adhesives according to the invention it is now possible, surprisingly, to produce sheet metal laminates which display optimum damping over a very large temperature band width, and in particular in the range of −25°C to +60°C which is of practical interest, so that in this special case the temperature band width of optimum damping encompasses 85°C.

The state of the prior art may further be ascertained by reference to Austrian Pat. No. 283,754 and to British Patent, Specification No. 1,214,497.

The Austrian Patent claims a vibration-damping epoxy resin produced by curing glycidylethers based on Bisphenol A and epichlorohydrin using polyoxypropyleneamine as the curing agent. By choice of the chain length of the polyoxypropyleneamine employed the maximum of the loss factor (d) may be placed anywhere in the temperature range of −50° to +130°C, but the disclosure does not contain any statement about the temperature band width achieved by one particular cured composition.

In the present invention a temperature band width of 85°C is obtained by the additional use of a mixture of phenol and heterocyclic amine, which also results in any desired variation of the damping region as has been shown by the examples.

The British Patent Specification No. 1,214,497 discloses a vibration-damping interlayer material comprising a vinylacetate-acrylate-maleate-crotonic copolymer.

This material has to be applied to the metal sheets after it was heated to the melting point and could not be applied at room temperature as the compositions of the present invention could. The thermoplastic material of the British Patent is also less resistant against temperature change. The adhesive properties of the copolymers can also not be compared with the curable compositions of the present invention, which contain epoxy resins, as is also disclosed by the above-mentioned Austrian Patent, first page, paragraph 4.

SUMMARY

The present invention relates to a method for manufacturing vibration-damping sheet metal laminates by applying to metal sheets at room temperature an adhesive composition comprising (a) an epoxy compound having more than one 1,2-epoxide groups per molecule, (b) a polyether-amine, which is the condensation product of a polyoxypropyleneamine, a phenol and an aldehyde, and (c) an heterocyclic amine and (d) a phenol, then joining the sheets together and first curing at room temperature with subsequent heat treatment. The epoxy resin and the curing agents are always employed in equivalent ratios.

The U.S. Pat. application Ser. No. 199,326 relates to a process for the manufacture of mouldings and coatings based on reaction products of epoxide compounds with more than one 1,2-epoxide group per molecule and polyether-amines, which are condensation products of polyoxypropyleneamines, phenols and aldehydes, and in which the mouldings or coatings produced from the mixture are cured. The manufacture of the mouldings and coatings as described therein, can optionally be shortened by adding substances having an accelerating action, from the group of the monohydric or polyhydric phenols, especially aminophenols, or of the monohydric or polyhydric alcohols, or by compounds such as mercapto compounds, thioethers, dithioethers or compounds possessing nitrogen-carbon-sulphur groupings or sulphoxide groups. These mixtures can also contain other aliphatic, cycloaliphatic or araliphatic amines as modifiers.

It has now been found that the curable compositions employed by the U.S. Pat. application Ser. No. 199,326 have outstanding vibration-damping properties if admixed with heterocyclic amines and optionally with polyamidoamines. Using this epoxide resin-curing agent system for the manufacture of vibration-damping sheet metal laminates according to the present invention results in optimum damping in the frequency range of 100 to 1,000 Hz and in the temperature range of −25°C to +60°C.

The epoxy resin-curing agent systems according to the invention, being thermosetting plastics, possess various further advantages after curing over the high polymer thermoplastic materials being used up to now. Their adhesion to metal surfaces is excellent. As a result of their good mechanical properties they are largely insensitive to the effects of pressure and temperature. They can be cured relatively rapidly and show favorable electrical properties.

As epoxide compounds with more than one 1,2-epoxide group per molecule it is possible to use the compounds mentioned in the U.S. Pat. application Ser. No. 199,326. It is also possible to use the modified epoxide compounds, soluble inorganic solvents, which are obtained by reaction of excess monoepoxides or polyepoxides with compounds containing OH groups and/or SH groups, in the presence of $BF_3$-amine complexes. The manufacture of these modified epoxide resins is described in U.S. Pat. application Ser. No. 160,148.

As accelerators, it is possible to use also p-tert.-butylphenol, amylphenol or nonylphenol, individually or as mixtures, Nonylphenol is most preferred.

As heterocyclic amines it is possible to use N-aminoethylpiperazine, piperazine, morpholine, piperidine, pyrrolidine, N-methylpiperazine and hydroxyethylpiperazine, whereby N-aminoethylpiperazine is most preferred. 5 percent by weight to 60 percent by weight of these additional components are employed, relative to the condensation product.

Additions in the lower range of 5 percent by weight to 30 percent by weight are particularly advisable for the manufacture of epoxide resin adhesives for the manufacture of sheet metal laminates, whilst additions of 30 to 60 percent by weight are preferred for the manufacture of relatively rapidly curing epoxide resin-curing agent systems giving excellent elastic and mechanical properties to the obtained plastics. These adhesives can preferably be employed as sealing compound for joints in the construction and shipbuilding business.

Through selection of the components one obtains, for example, epoxide resin adhesives which are outstandingly suitable for the manufacture of vibration-damping sheet metal laminates.

The metal sheets used for the laminates can be made of aluminum, steel, aluminum alloys, copper, galvanized metal or others, whereby steel and aluminum is preferred.

Preferably 20 – 130 percent by weight of the polyetheramine (b), 1 – 40 percent by weight of the heterocyclic amine (c), and 2 – 15 percent by weight of the phenol (d), and optionally 45 – 65 percent by weight of the polyamidoamine (e), all percentages relative to the amount of epoxy resin (a), are employed for the manufacture of the vibration-damping sheet metal laminates with the proviso that the epoxy resin (a) and the curing agents (b), (c), (d) and (e) are contained in equivalent ratios in the adhesive composition.

Manufacture of the modified epoxide resin used in the examples.

215 g of castor oil, 270 g of an epoxide resin based on Bisphenol A and epichlorohydrin, having a viscosity of 11,000 CP (25°C) and an epoxide equivalent of 187, and 1.3 g of $BF_3$-monoethylamine complex were warmed to a reaction temperature of 130°C under an atmosphere of dried nitrogen, whilst stirring. At this temperature, the epoxide equivalent was determined at intervals of 30 minutes. After 5 hours an epoxide equivalent of 475 was reached. The reaction was stopped by cooling to 120°C. The excess part of the $BF_3$ complex was rendered harmless by adding 3.5 g of finely powdered calcium hydroxide and stirring for 30 minutes. Thereafter the mixture was cooled to 100°C and filtered. The homogeneous reaction product had a viscosity of 22,400 cP, measured with the Höppler viscometer at 25°C, and a pot life (100 g of the reaction product mixed homogeneously with 6 g of triethylenetetramine) of 75 minutes at 20°C. By pot life there is understood the time interval between mixing the components and gelling of the mixture. The reaction product is a homogeneous internally plasticized epoxide resin of pale yellowish color.

MANUFACTURE OF THE CONDENSATION PRODUCT 1

2,000 g (= 1 mol) of polyoxypropylenediamine (molecular weight = 2,000) were warmed to 40°C and a mixture of 31.6 g of paraformaldehyde (1 mol) (95 percent strength by weight) and 30 g of deionized water was added over the course of 45 minutes, whilst cooling. After a further 30 minutes, 94 g of phenol liquefied by warming (1 mol) were added. After stirring for 30 minutes, the water of reaction was distilled off under a water pump vacuum of about 20 mm Hg whilst slowly heating the mixture to 100°C. At 100°C, the oily reaction product was left for a further 60 minutes under the water pump vacuum.

A reaction product of low viscosity, having a viscosity of 950 cP (25°C), a density of 0.98 (25°C), a hydrogen equivalent weight of 700 and an amine number of 53 is obtained.

The condensation product 1 mainly consists of the compound having the formula:

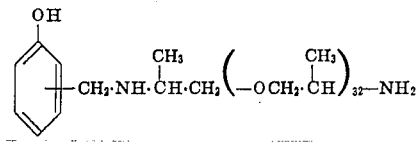

MIXTURE 1:

45 g of the abovementioned modified epoxide resin, 47 g of the abovementioned condensation product 1, 1.6 g of N-aminoethylpiperazine and 4.7 g of nonylphenol were stirred to give a homogeneous mixture which was used as an adhesive mixture.

MIXTURE 2:

45 g of the abovementioned modified epoxide resin, 58.7 g of the abovementioned condensation product 1, 0.8g of N-aminoethylpiperazine and 2.4 g of nonylphenol were stirred to give a homogeneous mixture which was used as an adhesive mixture.

MIXTURE 3:

45 g of the abovementioned modified epoxide resin, 37 g of the abovementioned condensation product 1, 2.25 g of N-aminoethylpiperazine and 6.75 g of nonylphenol were stirred to give a homogeneous mixture.

EXAMPLES 1-3:

Sheet metal laminates were manufactured with the adhesive mixtures 1 to 3 applying the adhesive mixtures to steel sheets and joining the latter together, the sheets being cured by 24 hours' storage at room temperature and subsequent heat treatment at 100°C for 2 hours.

The sheet metal laminates are manufactured with aluminum sheets or steel sheets of 0.5 to 1 mm thickness, with interlayers of 1.5 to 5 mm consisting of the epoxide resin adhesive systems according to the invention. The temperature band width is determined by determining the mechanical loss factor as a function of the temperature, for example at frequencies 100 Hz and 1,000 Hz, using the flexural vibration method and a suitable electromechanical apparatus, for example the electromechanical instrument of Bruel and Kjaer, Type 3930. Within the indicated temperature range, the magnitude of the mechanical loss factor is $\geq 0.05$.

The results are summarised in Table 1:

Table 1

|  | Temperature band width at 100 Hz (°C) | at 1,000 Hz (°C) | Average temperature band width (°C) |
|---|---|---|---|
| Example 1 | −22 to +46 | −28 to +31 | −25 to +39 |
| Example 2 | −27 to +38 | −31 to +21 | −29 to +29 |
| Example 3 | −19 to +78 | −27 to +43 | −23 to +60 |

MANUFACTURE OF CONDENSATION PRODUCT 2

1,000 g of polyoxypropylenediamine (molecular weight = 1,000 = 1 mol) were warmed to 40°C and 34.5 g of a 44 percent strength by weight aqueous formaldehyde solution (0.5 mol) were added over the course of 45 minutes whilst cooling. After a further 30 minutes, 94 g of phenol liquefied by warming (1 mol) were added. After stirring for 30 minutes, water was distilled off under a water pump vacuum of about 20 mm Hg whilst slowly heating the mixture to 100°C. At 100°C, the reaction product was left under the water pump vacuum for a further 30 minutes.

A reaction product of low viscosity, having a hydrogen equivalent weight of 314, is obtained. The condensation product 2 mainly consists of the compound having the formula:

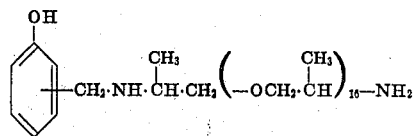

EXAMPLE 4:

100 g of an epoxide resin based on Bisphenol A and epichlorohydrin, having an epoxide equivalent of 185, 55 g of the condensation product 2 and 35 g of N-aminoethylpiperazine were homogeneously mixed and cast to give 10 and 4 mm thick test sheets. After curing for 24 hours at room temperature, the test sheets were additionally subjected to a heat aftertreatment for 2 hours at 100°C. Thereafter, the test sheets were machined into test specimens and subjected to the mechanical and electrical tests. The results of these measurements are summarized in Table 2.

Table 2

| | |
|---|---|
| Tensile strength | 490 kp/cm² |
| Impact strength | 70 kpcm/cm² |
| Flexural strength (modulus of rupture) | 720 kp/cm² |
| E-modulus from flexural test | 25,000 kp/cm² |
| Ball indentation hardness, 60'' | not constant |
| Shore hardness | 93 |
| Martens softening point | 38°C |
| Surface resistance at 1,000 V | $10^{11}\Omega$ |
| Volume resistance | $10^{14}\Omega$cm |
| Dielectric constant at $10^6$Hz | 3.20 |
| Dielectric loss factor at $10^6$ Hz | 0.040 |
| Tracking resistance | KA 3c/0.4 mm |

These epoxy resin-curing agent-systems show a high elasticity beside good mechanical strength as is shown by the above table. They qualify excellently as joint filler which is resistant against cold, permanently elastic and damping vibrations as well as in connection with glass filament web or thermoplastic surface fleeces for covering gaps in construction parts of concrete, for instance.

Furthermore coating of steel construction for the purpose of damping vibrations has to be mentioned, for instance bridge constructions.

The plastics maintain the mentioned properties over the range of −20° to +60°C. A recipe for a joint filling composition is given in Example 8.

In a special embodiment of the invention, the usual additives are used in the form of a combination consisting of phenols, heterocyclic amines and polyamidoamines. The addition of polyamidoamine imparts a better mechanical strength to the interlayers. Vibration-damped sheet metal laminates can be manufactured particularly cheaply with such an additive combination. A typical embodiment includes a curable mixture consisting of 40 to 60 percent by weight of the modified epoxide resin already mentioned, 10 to 20 percent by weight of the condensation product 1, 1 to 5 percent by weight of N-aminoethylpiperazine, 3 to 6 percent by weight of nonylphenol and 20 to 30 percent by weight of a polyamidoamine having an amine number of about 100. Preferably, a mixture of 50 percent by weight of the modified epoxide resin already mentioned, 13.5 percent by weight of the condensation product 1, 2 percent by weight of N-aminoethylpiperazine, 5.2 percent by weight of nonylphenol and 29.3 percent by weight of a polyamidoamine, manufactured from a copolymer of styrene and conjugated unsaturated fatty acids and an alkylenepolyamine of the formula $H_2N.CH_2.CH_2(HN.CH_2.CH_2)_n.NH_2$ wherein $n$ can = 2 and/or 3, and having an amine number of 85 – 100, is used.

As polyamidoamines it is possible to use reaction products of polyamines with fatty acids, dimerized, trimerized and polymerized fatty acids and copolymerized fatty acids, for example with sytrene, vinyltoluene, cyclopentadiene, indene, acrylic acid or methacrylic acid, and also reaction products of polyamines with adducts of α,β-unsaturated monocarboxylic acids or dicarboxylic acids or their anhydrides with unsaturated fatty acids having 6 to 22 carbon atoms, which in part can also be present as Diels-Alder addition products and in part can also contain imidazoline rings. The imidazoline rings are produced by further heating of polyamidoamines which are capable of cyclization. The manufacture and/or use of polyamidoamines is described, for example, in the following patent specifications:

German Published Specification No. 1,520,052,
German Published Specification No. 1,130,809,
U.S. Pat. No. 2,450,940,
British Patent Specification No. 803,517,
German Patent Specification No. 1,150,520,
German Displayed Specification No. 1,520,677.

MIXTURE 5:

45 g of the abovementioned modified epoxide resin, 11.8 g of the abovementioned condensation product 1, 1.6 g of N-aminoethylpiperazine, 4.7 g of nonylphenol and 26.3 g of a polyamidoamine, manufactured from diethylenetetramine and an oligomeric copolymer of styrene and conjugated unsaturated fatty acids, having a viscosity of 450 – 650 P, measured at 40°C in a rotation viscometer, and an amine number of 85 – 100, was stirred to give a homogeneous mixture.

EXAMPLE 5:

Using this adhesive mixture, sheet metal laminates were produced by gluing, in accordance with the data in the appendix to Example 3, and were subjected to measurements.

The measurement of the temperature range of optimum vibration damping gave the following picture:

Table (adhesive mixture 5)

| Temperature band width (°C) at 100 Hz | at 1,000 Hz | Average temperature band width (°C) |
|---|---|---|
| +12 to +78 | +2 to +67 | +7 to +73 |

Plastic cementings obtained of the mixture according to Example 5 are additionally distinguished by high shear strengths and peel strengths.

MIXTURE 6:

45 g of the abovementioned modified epoxy resin, 34 g of the abovementioned condensation product 1, 2.75 g of N-aminoethylpiperazine and 8.25 g of nonylphenol were stirred to give a homogeneous mixture. This mixture was used as adhesive.

MIXTURE 7:

45 g of the abovementioned modified epoxy resin, 28 g of the abovementioned condensation product 1, 3.25 g N-aminoethylpiperazine and 9.75 g nonylphenol were stirred to give a homogeneous mixture. This mixture was used as adhesive.

EXAMPLES 6 and 7:

Using these adhesive compositions 6 and 7 cementings were carried out to manufacture sheet metal laminates according to the instructions following Example 3. The obtained laminates were subjected to the corresponding tests.

| | Temperature band width at 100 Hz (°C) | at 1,000 Hz (°C) | Average temperature band width (°C) | maximum damping (maximum value of mechanical loss factor) at Hz (°C) | at 1,000 Hz (°C) |
|---|---|---|---|---|---|
| Example 6 | −20 to +67 | −28 to +46 | −24 to +57 | 7(0.18) | 5(0.37) |
| Example 7 | −23 to +65 | −33 to +41 | −28 to +53 | 10(0.20) | 0(0.36) |

The obtained cementings do also not lose their property of damping vibrations upon aging.

Sheet metal laminates produced from adhesive compositions of Examples 3 and 5, which represent the most preferred embodiments, were subjected to an artificial aging procedure by tempering at 80°C for 3 to 6 months. Thereafter the temperature band width was again determined by testing the mechanical loss factor in relation to the temperature at the frequencies of 100 and 1,000 Hz. As can be shown by the attached curves 1 and 2 shift of the temperature band width to the positive region amounted to maximal 10°C. The values of the damping maxima were essentially not affected.

THE DRAWINGS

Figure 2:
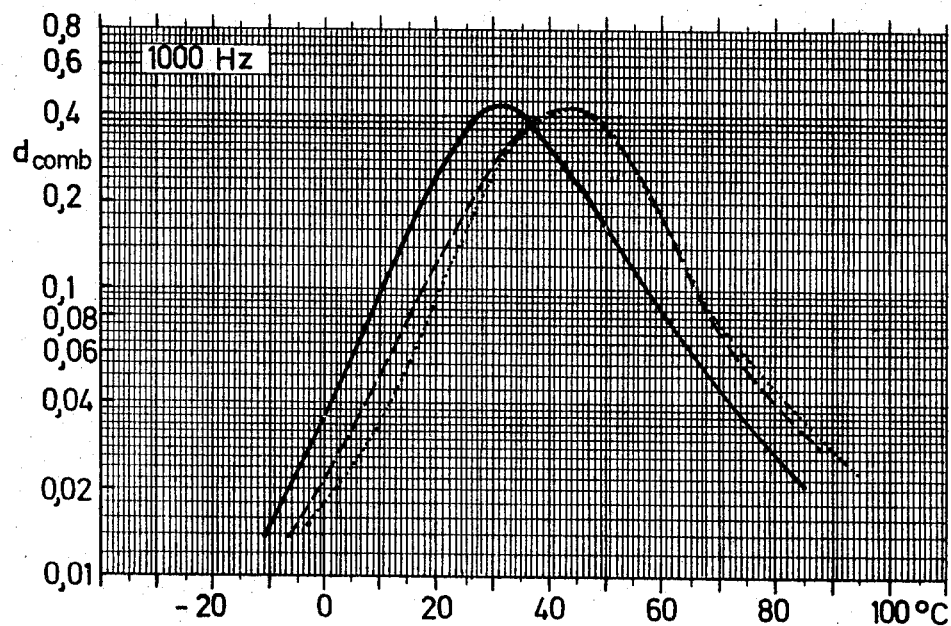

FIG. 1 and FIG. 2 of the present invention show the results of vibration-damping measurements of sheet metal laminates made according to the present process using the adhesive compositions of Examples 3 and 5. The flexural vibration method has been carried out with the electromechanical apparatus of Bruel and Kjaer, Type 3930, referred to above in in Examples 1–3.

In both figures the solid line (-) represents data obtained from laminates that were cured at 120°C for 2 hours; the broken line (-----) represents data obtained from laminates that were cured under the same conditions but were aged for 3 months at 80°C; the dotted line (.....) represents data obtained from laminates that were cured in the same manner but were aged thereafter for 6 months at 80°C. The drawings show that by aging, the maximum temperature band width is moved slightly toward higher temperatures. FIG. 1 shows the results at vibrations of 100 Hz, and FIG. 2 shows the results at vibrations of 1000 Hz. The symbol $d_{comb}$ represents the mechanical loss factor.

EXAMPLE 8:

100 g of the abovementioned plasticized epoxy resin, 41 g of condensation product 1, 10 g of N-aminoethylpiperazine, 31 g of nonylphenol were mixed homogeneously together with a pigment paste, for example titanium dioxide, which is ground with dioctylphthalate. This composition can be worked at room temperature during five hours and complete curing takes place at room temperature after about 30 hours.

In order to be applied to vertical surfaces the composition may contain 3–5 g highly disperse and pyrogenic silicic acid (particle size 2 – 40 m$\mu$, $SiO_2$ content about 98 percent by weight).

Epoxy resins based on Bisphenol A with epoxy equivalent weights of 180 to 500 may be used in the corresponding ratio, instead of the plasticized epoxy resins of Examples 1 to 8, in admixture with plasticizing additives in amounts of 5 to 35 percent by weight such as phthalic acid ester or adipic acid ester of mono- or dialcohols such as n-butanol, amyl alcohol, 2-ethylhexanol, nonanol, benzylalcohol, furfuryl alcohol or ethylene glycol or of lactones such as γ-butyrolactone, δ-valerolactone and ε-caprolactone, or of lower and higher molecular polyols, for example glycerol, trimethylolpropane or ethylene glycol as well as the abovementioned polyols as oxethylated or oxpropylated alcohols.

EXAMPLE 9:

The instructions given in Example 8 are followed. Instead of 100 g of the plasticized epoxy resin now a mixture of 40 g of epoxy resin based on Bisphenol A having an epoxy equivalent weight of 190, and 10 g dibutylphthalate is employed. The obtained gap filling corresponds essentially after curing to the result obtained in Example 8.

What is claimed is:

1. Vibration-damping sheet metal laminates prepared by a method which comprises applying to metal sheets at room temperature an adhesive composition comprising
   a. an epoxy compound having more than one 1,2-epoxy group per molecule,
   b. a poly-ether amine, which is the condensation product of
      a polyoxypropyleneamine
      a phenol and
      an aldehyde,
   c. a heterocyclic amine and
   d. a phenol, then joining the sheets together and first curing at room temperature with subsequent heat treatment, wherein the adhesive composition contains 20–130 percent by weight of component (b), 1–40 percent by weight of component (c) and 2–15 percent by weight of component (d), all percentages being relative to the amount of component (a), with the proviso that the epoxy resin (a) and the curing agents (b), (c) and (d) are contained in an equivalent ratio.

2. Vibration-damping sheet metal laminate prepared according to the method of claim 1 wherein the adhesive composition further contains (e) a polyamidoamine.

3. Vibration-damping sheet metal laminates according to claim 1 wherein the epoxy compound (a) is based upon Bisphenol A, epichlorohydrin and castor oil and has an epoxide equivalent of about 187.

4. Vibration-damping sheet metal laminate according to claim 1 wherein the heterocyclic amine (c) is N-aminoethylpiperazine.

5. Vibration-damping sheet metal laminate according to claim 1 wherein the phenol (d) is nonylphenol.

6. Vibration-damping sheet metal laminate according to claim 1 wherein the polyetheramine (b) is

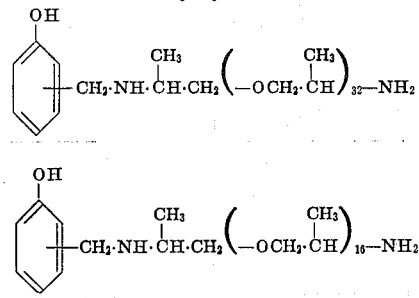

7. Vibration-damping sheet metal laminate according to claim 2, wherein the polyamidoamine (e) is a reaction product of diethylenetetramine, an oligomeric copolymer of styrene and conjugated unsaturated fatty acid, having an amine number of 85 to 100 and a viscosity of 450 – 650 P (40°C).

8. Vibration-damping sheet metal laminate according to claim 2, wherein the adhesive composition contains 45 – 65 percent by weight of component (e) relative to the amount of component (a), with the proviso that the epoxy resin (a) and the curing agents (b), (c), (d) and (e) are contained in an equivalent ratio.

* * * * *